US012563500B2

(12) United States Patent
Garg et al.

(10) Patent No.: US 12,563,500 B2
(45) Date of Patent: Feb. 24, 2026

(54) OPTIMIZING POWER RESOURCES FOR INTERCONNECTED MOBILE IoT DEVICES

(71) Applicant: T-Mobile USA, Inc., Bellevue, WA (US)

(72) Inventors: Parag Garg, Woodinville, WA (US); Nicholas LaVassar, Issaquah, WA (US); Christopher Painter, Kirkland, WA (US); Dhruv Chadha, Kirkland, WA (US); Gavin Feuer, Seattle, WA (US); Joseph Baird, Kent, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/531,527

(22) Filed: Dec. 6, 2023

(65) Prior Publication Data

US 2024/0107458 A1 Mar. 28, 2024

Related U.S. Application Data

(62) Division of application No. 17/837,008, filed on Jun. 9, 2022, now Pat. No. 11,864,119, which is a division
(Continued)

(51) Int. Cl.
*H04W 52/02* (2009.01)
*H04W 4/80* (2018.01)
(Continued)

(52) U.S. Cl.
CPC ......... *H04W 52/0277* (2013.01); *H04W 4/80* (2018.02); *H04W 52/0216* (2013.01);
(Continued)

(58) Field of Classification Search
CPC ......... H04W 52/0277; H04W 52/0216; H04W 52/0258; H04W 4/80; H04W 64/003;
(Continued)

(56) References Cited

U.S. PATENT DOCUMENTS

| | | |
|---|---|---|
| 8,380,999 B1 | 2/2013 | Robison |
| 11,388,674 B2 | 7/2022 | Garg |

(Continued)

OTHER PUBLICATIONS

U.S. Appl. No. 16/724,911, Notice of Allowance mailed Mar. 10, 2022, 30 pages.
(Continued)

*Primary Examiner* — Michael Y Mapa

(57) ABSTRACT

A central IoT controller is described for conserving power resources of mobile IoT devices. Specifically, the central IoT controller is configured to at least monitor power reserves of mobile IoT devices, and in response to detecting that a power reserve has fallen below a predetermined threshold, generate computer-executable instructions that adjust configuration settings of the mobile IoT devices to conserve a remaining power reserve. The central IoT controller may modify a check-in interval for mobile IoT devices, configure the transmission of data communications via more power-efficient communication protocols, or reduce the number of active sensors on the mobile IoT device based on proximity to a trusted geolocation or a trusted device. Further, data communications may be rerouted via a proximate trusted device or other proximate mobile IoT device, in response to such device providing an efficiency with respect to available communication protocols.

12 Claims, 8 Drawing Sheets

┌─ 800

DETERMINE THAT A POWER RESERVE OF A FIRST MOBILE IoT DEVICE IS LESS THAN A PREDETERMINED RESERVE THRESHOLD
802

DETECT ONE OF A SECOND MOBILE IoT DEVICE OR A TRUSTED DEVICE THAT IS WITHIN PROXIMITY TO THE FIRST MOBILE IoT DEVICE
804

GENERATE A SET OF CONFIGURATION DATA THAT FACILITATES A TRANSMISSION AND RECEIPT OF DATA COMMUNICATIONS BETWEEN THE CENTRAL IoT CONTROLLER AND FIRST MOBILE IoT DEVICE TO OCCUR VIA THE SECOND MOBILE IoT DEVICE OR THE TRUSTED DEVICE
806

TRANSMIT THE SET OF CONFIGURATION DATA TO THE SECOND MOBILE IoT DEVICE OR THE TRUSTED DEVICE
808

Related U.S. Application Data of application No. 16/724,911, filed on Dec. 23, 2019, now Pat. No. 11,388,674.

(60) Provisional application No. 62/799,955, filed on Feb. 1, 2019, provisional application No. 62/784,126, filed on Dec. 21, 2018.

(51) Int. Cl.
    *H04W 64/00*     (2009.01)
    *H04W 84/18*     (2009.01)

(52) U.S. Cl.
    CPC ..... *H04W 52/0258* (2013.01); *H04W 64/003* (2013.01); *H04W 84/18* (2013.01)

(58) Field of Classification Search
    CPC ....... H04W 84/18; H04W 4/023; H04W 4/38; H04W 4/50; H04W 4/70; Y02D 30/70
    USPC .................................. 370/318; 455/405, 574
    See application file for complete search history.

(56) References Cited

U.S. PATENT DOCUMENTS

| | | |
|---|---|---|
| 2008/0165714 A1 | 7/2008 | Dettinger |
| 2009/0204354 A1* | 8/2009 | Davis .................... H04W 84/18 |
| | | 702/89 |
| 2010/0235121 A1 | 9/2010 | Constien |
| 2015/0017965 A1* | 1/2015 | Lim .................. H04W 52/0258 |
| | | 455/418 |
| 2015/0199919 A1 | 7/2015 | Ander |
| 2016/0150072 A1 | 5/2016 | Rangarajan |
| 2016/0286564 A1* | 9/2016 | Berggren .............. H04W 76/15 |
| 2017/0065464 A1* | 3/2017 | Heil .................. G06K 7/10366 |

OTHER PUBLICATIONS

U.S. Appl. No. 16/724,911, Office Action mailed Oct. 28, 2021, 35 pages.
U.S. Appl. No. 17/837,008, Notice of Allowance mailed Aug. 9, 2023, 29 pages.
U.S. Appl. No. 17/837,008, Office Action mailed Mar. 15, 2023, 40 pages.

* cited by examiner

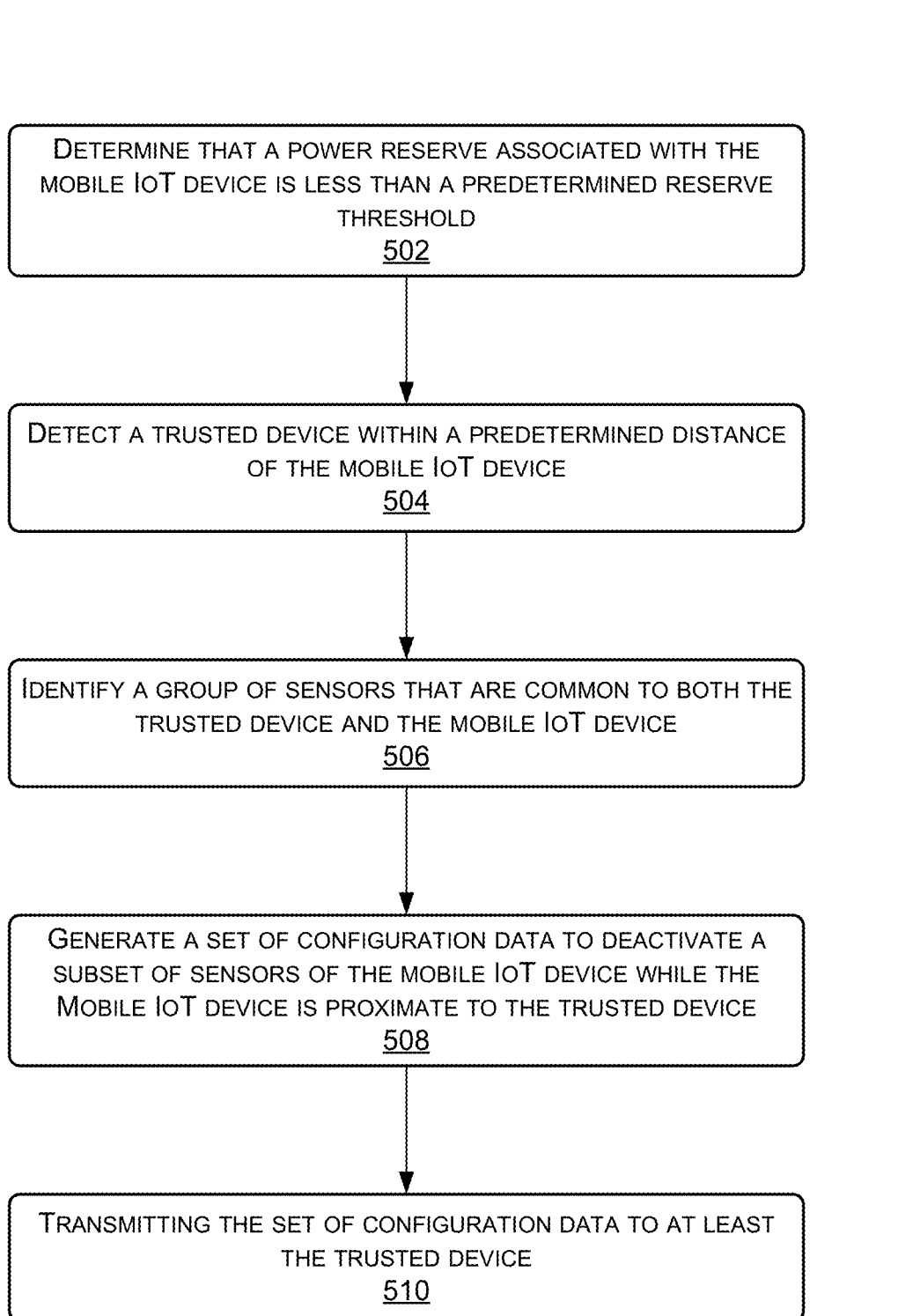

500

DETERMINE THAT A POWER RESERVE ASSOCIATED WITH THE MOBILE IoT DEVICE IS LESS THAN A PREDETERMINED RESERVE THRESHOLD
502

DETECT A TRUSTED DEVICE WITHIN A PREDETERMINED DISTANCE OF THE MOBILE IoT DEVICE
504

IDENTIFY A GROUP OF SENSORS THAT ARE COMMON TO BOTH THE TRUSTED DEVICE AND THE MOBILE IoT DEVICE
506

GENERATE A SET OF CONFIGURATION DATA TO DEACTIVATE A SUBSET OF SENSORS OF THE MOBILE IoT DEVICE WHILE THE MOBILE IoT DEVICE IS PROXIMATE TO THE TRUSTED DEVICE
508

TRANSMITTING THE SET OF CONFIGURATION DATA TO AT LEAST THE TRUSTED DEVICE
510

FIG. 5

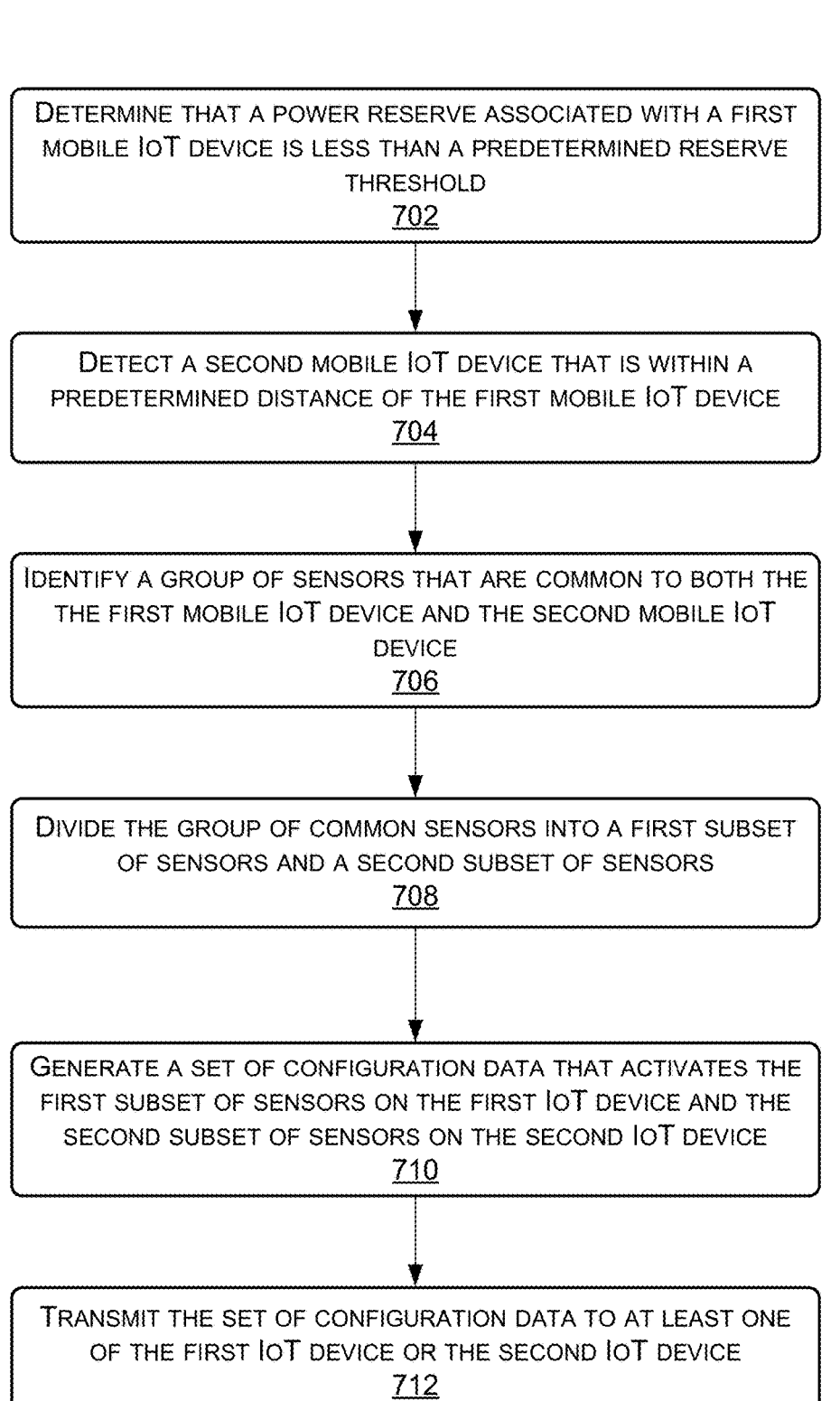

DETERMINE THAT A POWER RESERVE ASSOCIATED WITH A FIRST
MOBILE IoT DEVICE IS LESS THAN A PREDETERMINED RESERVE
THRESHOLD
702

DETECT A SECOND MOBILE IoT DEVICE THAT IS WITHIN A
PREDETERMINED DISTANCE OF THE FIRST MOBILE IoT DEVICE
704

IDENTIFY A GROUP OF SENSORS THAT ARE COMMON TO BOTH THE
THE FIRST MOBILE IoT DEVICE AND THE SECOND MOBILE IoT
DEVICE
706

DIVIDE THE GROUP OF COMMON SENSORS INTO A FIRST SUBSET
OF SENSORS AND A SECOND SUBSET OF SENSORS
708

GENERATE A SET OF CONFIGURATION DATA THAT ACTIVATES THE
FIRST SUBSET OF SENSORS ON THE FIRST IoT DEVICE AND THE
SECOND SUBSET OF SENSORS ON THE SECOND IoT DEVICE
710

TRANSMIT THE SET OF CONFIGURATION DATA TO AT LEAST ONE
OF THE FIRST IoT DEVICE OR THE SECOND IoT DEVICE
712

FIG. 7

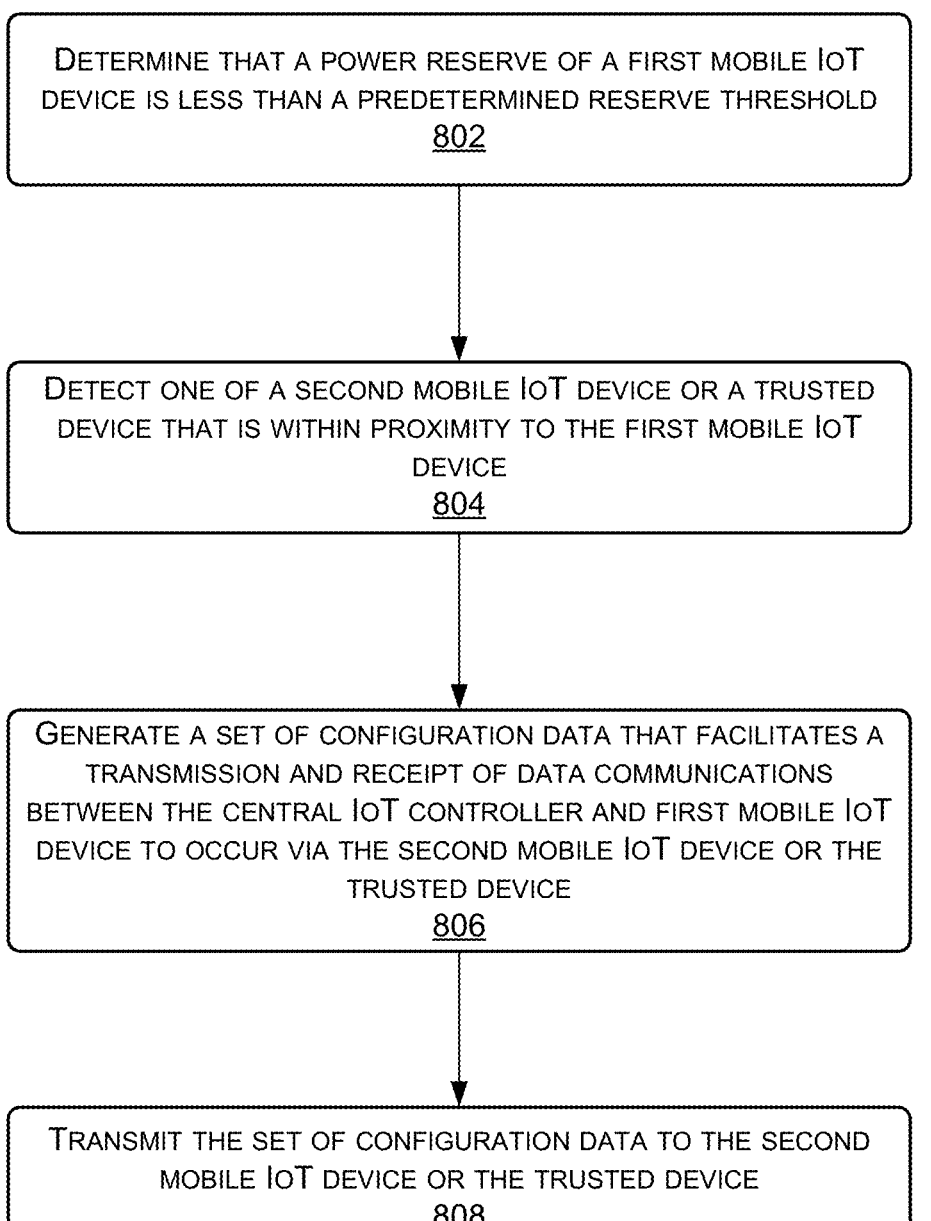

800

DETERMINE THAT A POWER RESERVE OF A FIRST MOBILE IoT DEVICE IS LESS THAN A PREDETERMINED RESERVE THRESHOLD
802

DETECT ONE OF A SECOND MOBILE IoT DEVICE OR A TRUSTED DEVICE THAT IS WITHIN PROXIMITY TO THE FIRST MOBILE IoT DEVICE
804

GENERATE A SET OF CONFIGURATION DATA THAT FACILITATES A TRANSMISSION AND RECEIPT OF DATA COMMUNICATIONS BETWEEN THE CENTRAL IoT CONTROLLER AND FIRST MOBILE IoT DEVICE TO OCCUR VIA THE SECOND MOBILE IoT DEVICE OR THE TRUSTED DEVICE
806

TRANSMIT THE SET OF CONFIGURATION DATA TO THE SECOND MOBILE IoT DEVICE OR THE TRUSTED DEVICE
808

FIG. 8

OPTIMIZING POWER RESOURCES FOR INTERCONNECTED MOBILE IoT DEVICES

RELATED APPLICATIONS

This application is a divisional of U.S. patent application Ser. No. 17/837,008, filed on Jun. 9, 2022, and titled "Optimizing Power Resources for Interconnected Mobile IoT Devices," which is a divisional of U.S. patent application Ser. No. 16/724,911, filed on Dec. 23, 2019, and titled "Optimizing Power Resources for Interconnected Mobile IoT Devices," issued as U.S. Pat. No. 11,388,674 on Jul. 12, 2022, which claims the benefit of U.S. Provisional Patent Application No. 62/784,126, filed Dec. 21, 2018, and titled "Dependent Centric Data and Analytics Mobile Platform" and U.S. Provisional Application No. 62/799,955, filed Feb. 1, 2019, and titled "Mobile Platform for Ad-Hoc Remote State Tracking," which are herein incorporated by reference in their entirety.

BACKGROUND

The "Internet of Things" (IoT) refers to the interconnection of uniquely identifiable embedded devices within the internet infrastructure. Ultimately, an IoT device is expected to result in new, wide-ranging types of applications in which virtually any type of physical thing may provide information about itself or its surroundings and/or may be controlled remotely via client devices of the Internet.

IoT devices are configured to be ultra-low power devices capable of operating for extended periods of time on battery power. However, the extent to which IoT devices expend their power resources is a function of the type of data captured by the IoT devices along with the communication protocols used to transmit the same. For example, a communication protocol, such as a Long-Term Evolution (LTE) communication protocol, may consume relatively more power than a lower-power wireless communication technology such a Wi-Fi communication protocol or Bluetooth Low Energy (LE). Similarly, an IoT sensor that captures audio data may consume more power than an IoT sensor configured to capture temperature data.

As the IoT ecosystem evolves there is a need for a flexible IoT implementation that supports efficient power management, without compromising the capability to transmit and receive critical data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates a process for deactivating a subset of sensors associated with mobile IoT device while the mobile IoT device is proximate to a trusted device.

FIG. 7 illustrates a process for apportioning the capture of sensor data to mobile IoT devices that are within a predetermined distance to one another.

FIG. 8 illustrates a process for facilitating the transmission and receipt of data communications between the central IoT controller and a first mobile IoT device to occur via a second mobile IoT device or a trusted device.

DETAILED DESCRIPTION

Figure 1:
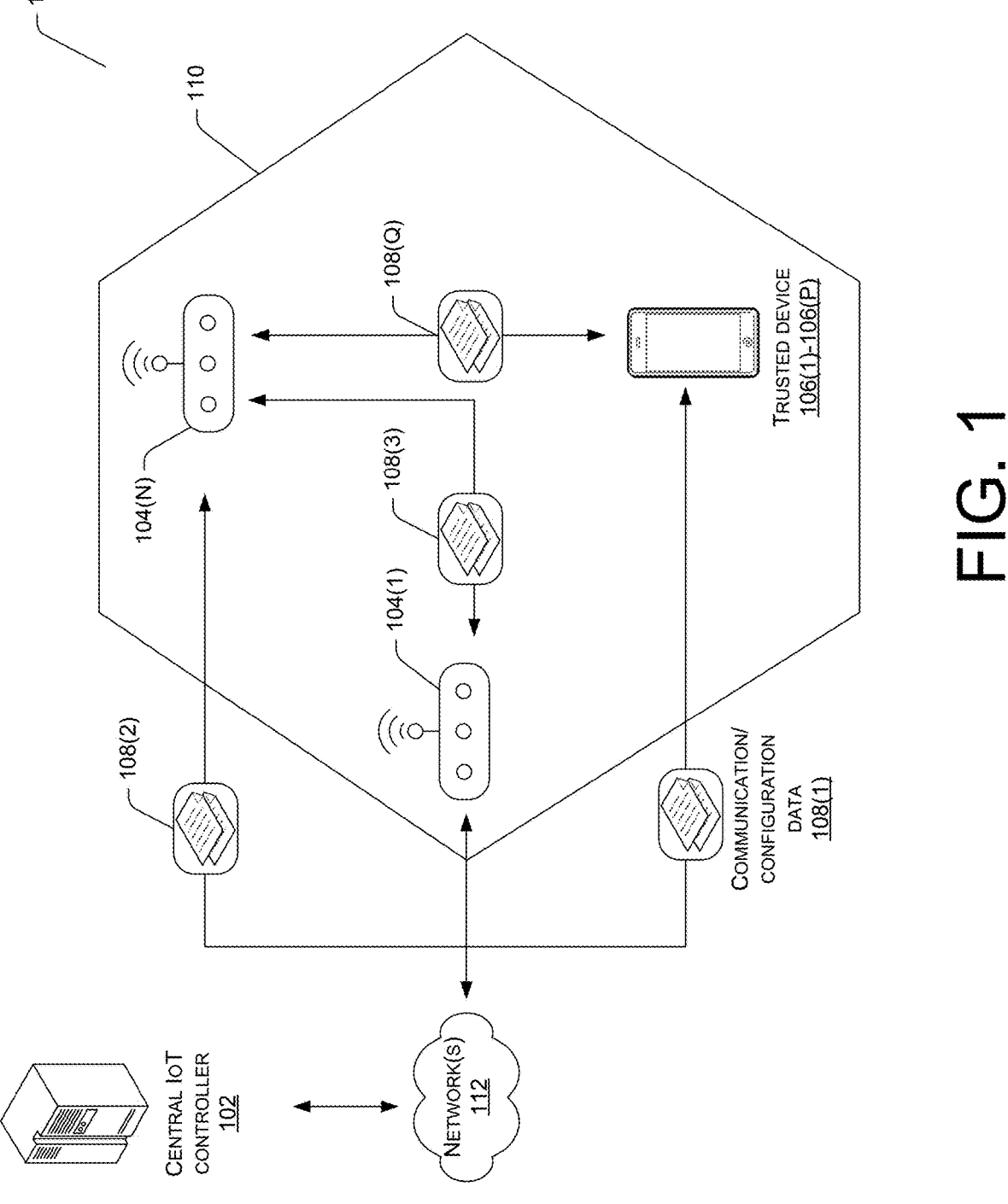
FIG. 1 illustrates a computing environment that facilitates the operation of the central IoT controller.

This disclosure describes techniques that facilitate a central IoT controller that is configured to monitor, interact, and support mobile IoT devices that experience power reserves that fall below a predetermined threshold. While mobile IoT devices are generally ultra-low-power devices, the depletion of their power resources can be impacted by the plethora of signal data that these devices capture, process, and transmit. Moreover, power resources may be impacted by the frequency with which a mobile IoT device captures signal data and the periodic check-in interval with which the mobile IoT device transmits signal data to a central IoT controller. The term "signal data," as used herein may represent data communications sent and/or received from a central IoT controller, and sensor data captured by a mobile IoT device.

This disclosure describes techniques that facilitate a central IoT controller to at least monitor power reserves of mobile IoT devices, and in response to detecting that a power reserve has fallen below a predetermined threshold, generate computer-executable instructions that adjust configuration settings of the mobile IoT devices to conserve a remaining power reserve. In one example, the central IoT controller may generate computer-executable instructions that modify a communication protocol used to transmit signal data to and from the mobile IoT device. For example, a mobile IoT device may be configured to transmit signal data over a Radio Frequency (RF) communication protocol, such as Long-Term Evolution (LTE). To conserve power, the central IoT controller may adjust configuration settings of the mobile IoT device such that signal data is sent through an available communication protocol that consumes less power than the RF communication protocol, such as a Wi-Fi or a Bluetooth communication protocol.

In another example, the central IoT controller may reassign the responsibility of capturing a set of sensor data from the mobile IoT device to a trusted device that is within proximity to the mobile IoT device. In this example, the central IoT controller may detect the presence of a trusted device via a monitored interaction with the mobile IoT device. Alternatively, the central IoT controller may detect the presence of the trusted device by interrogating the Local Access Network (LAN) hosting the mobile IoT device. In any case, while the mobile IoT device is proximate to the trusted device, the central IoT controller may identify a subset of sensors common to the mobile IoT device and the trusted device. In doing so, the central IoT controller may act to deactivate the subset of sensors on the mobile IoT device and instead capture the same sensor data from the corresponding subset of sensors on the trusted device. In this way, the central IoT controller may conserve the power resources of the mobile IoT device, while capturing the same sensor data from the trusted device.

Additionally, the central IoT controller may deactivate a subset of sensors on the mobile IoT device based on determining that the mobile IoT device is located at a trusted geolocation. For example, the central IoT controller may monitor and detect a current geolocation of the mobile IoT device at predetermined check-in intervals. The central IoT controller may employ one or more machine-learning algorithms to correlate the current geolocation with historical geolocations (i.e. based on historical sensor data) to infer whether the current geolocation is a trusted geolocation. At a trusted geolocation, the central IoT controller may deactivate a subset of sensors on the mobile IoT device to reduce power consumption.

Further, the central IoT controller may share the responsibility of capturing sensor data to a group of mobile IoT devices that are proximate to one another. For example, the central IoT controller may identify a first mobile IoT device that is proximate to a second mobile IoT device, and further, identify a group of common sensors shared by the first mobile IoT device and the second mobile IoT device. Here, the central IoT controller may divide the group of common sensors into subsets, the number of subsets being based on the number of mobile IoT devices proximate to one another. In the illustrated example, two mobile IoT devices are proximate to one another, namely the first mobile IoT device and the second mobile IoT device. Accordingly, the central IoT controller may divide the group of common sensors into two subsets. For the first mobile IoT device, the central IoT controller may activate the first subset of sensors and deactivate the second subset of sensors. For the second mobile IoT device, the central IoT controller may activate the second subset of sensors and deactivate the first subset of sensors. By sharing the responsibility of capturing sensor data between the two mobile IoT devices, each mobile IoT device is able to conserve power resources, without impacting the central IoT controller's ability to capture a full suite of sensor data. It is noteworthy that even though the illustrated example describes two mobile IoT devices sharing the responsibility of capturing sensor data, the same techniques may apply to any number of mobile IoT devices that are proximate to one another.

Moreover, the central IoT controller may facilitate redirecting data communications associated with a first mobile IoT device to alternate devices proximate to the first mobile IoT device. For example, the central IoT controller may selectively route data communications intended for a first mobile IoT device to an alternate device, such as a second mobile IoT device or a trusted device. In doing so, the central IoT controller may also transmit computer-executable instructions that cause the alternate device to forward the data communications to the first mobile IoT device. The central IoT controller may employ this technique on the basis that the communication protocol between the first mobile IoT device and the alternate device consumes less power relative to the communication protocol between the first mobile IoT device and the central IoT controller.

Similarly, the central IoT controller may configure the first mobile IoT device to redirect data communications intended for the central IoT controller to an alternate device, such as a second mobile IoT device or a trusted device. In doing so, the first mobile IoT device may be configured, by the central IoT controller, to include computer-executable instructions that cause the alternate device to forward the data communications to the central IoT controller. Again, the central IoT controller may employ this technique on the basis that the communication protocol between the first mobile IoT device and the alternate device consumes less power relative to the communication protocol between the first mobile IoT device and the central IoT controller.

Further, the term "techniques," as used herein, may refer to system(s), method(s), computer-readable instruction(s), module(s), algorithms, hardware logic, and/or operation(s) as permitted by the context described above and through the document.

FIG. 1 illustrates a computing environment 100 that facilitates the operation of the central IoT controller 102. The central IoT controller 102 may be configured to interact with one or more mobile IoT device(s) 104(1)-104(N) and one or more trusted device(s) 106(1)-106(P). The central IoT controller 102 may configure the mobile IoT device(s) 104(1)-104(N) to periodically check-in with the central IoT controller 102. The periodic check-in may comprise data communication(s) 108(1)-108(Q) sent by the mobile IoT device(s) 104(1)-104(N) to the central IoT controller 102. The data communication(s) 108(1)-108(Q) may indicate that the mobile IoT device(s) 104(1)-104(N) are active. Additionally, or alternatively, the data communication(s) 108(1)-108(Q) may include sensor data (i.e. power resources, geolocation, etc.) captured by the mobile IoT device(s) 104(1)-104(N).

The data communication(s) 108(1)-108(Q) may further include an indication of the communication protocols available to mobile IoT device(s) 104(1)-104(N), an indication of current communication protocols being used by the mobile IoT device(s) 104(1)-104(N), and an indication of trusted device(s) 106(1)-106(P) proximate to the mobile IoT device(s) 104(1)-104(N), which may be indicative via a paired status.

Trusted device(s) 106(1)-106(P) may correspond to devices with which the mobile IoT device(s) 104(1)-104(N) has previously, and/or frequently interacted. For example, a trusted device(s) 106(1)-106(P) may correspond to another mobile IoT device that is frequently within proximity to the mobile IoT device(s) 104(1)-104(N) in a trusted geolocation. In another example, the trusted device(s) 106(1)-106(P) may correspond to an electronic device, such as a mobile phone, a computing device, a server device, or a router device that has been designated with a trusted device status, by the central IoT controller 102. The trusted device status may be implied based on an association with a trusted location, such as a business or residential location. In other examples, the trusted device status may be expressed by a subscriber to the mobile IoT device, via the central IoT controller 102.

In some examples, data communication(s) 108(1)-108(Q) sent by the central IoT controller 102 to mobile IoT device(s) 104(1)-104(N) may act to reconfigure an operation of the mobile IoT device(s) 104(1)-104(N) to conserve its current power resources. For example, the central IoT controller 102 may generate and transmit data communication(s) 108(1)-108(Q) to mobile IoT device(s) 104(1)-104(N) that deactivate a subset of sensors based on the mobile IoT device(s) 104(1)-104(N) proximity to trusted device(s) 106(1)-106(P), or proximity to a trusted geolocation. Similarly, data communication(s) 108(1)-108(Q) may be configured to activate a first subset of sensors and deactivate a second subset of sensors on mobile IoT device(s) 104(1)-104(N), based on the central IoT controller 102 configuring a number of mobile IoT device(s) 104(1)-104(N), proximate to one another, to share responsibility for capturing the full suite of sensor data.

The trusted device(s) 106(1)-106(P), as described herein, may be a mobile handset, a smartphone, a tablet computer, a personal digital assistant (PDA), a smartwatch, or any other electronic communication or Internet of Things (IoT) device that is capable of executing applications.

The mobile IoT device(s) 104(1)-104(N) may be electronic devices that include sensing and/or control functionality as well as a wireless network transceiver radio or other interfaces that allow the mobile IoT device(s) 104(1)-104(N) to communicate with a wide area network and with one or more other devices. The wireless network transceiver radio or interface may include a Wi-Fi transceiver radio or interface, an Ultra-Wideband (UWB) transceiver radio or interface, or a Bluetooth transceiver radio or interface.

The central IoT controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interfaces to enable communications with other networked devices via one or more network(s) 112.

Moreover, the one or more network(s) 112 may include public networks such as the Internet, private networks such as an institutional and/or personal intranet, or some combination of private and public networks. The one or more network(s) can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof.

Figure 2:
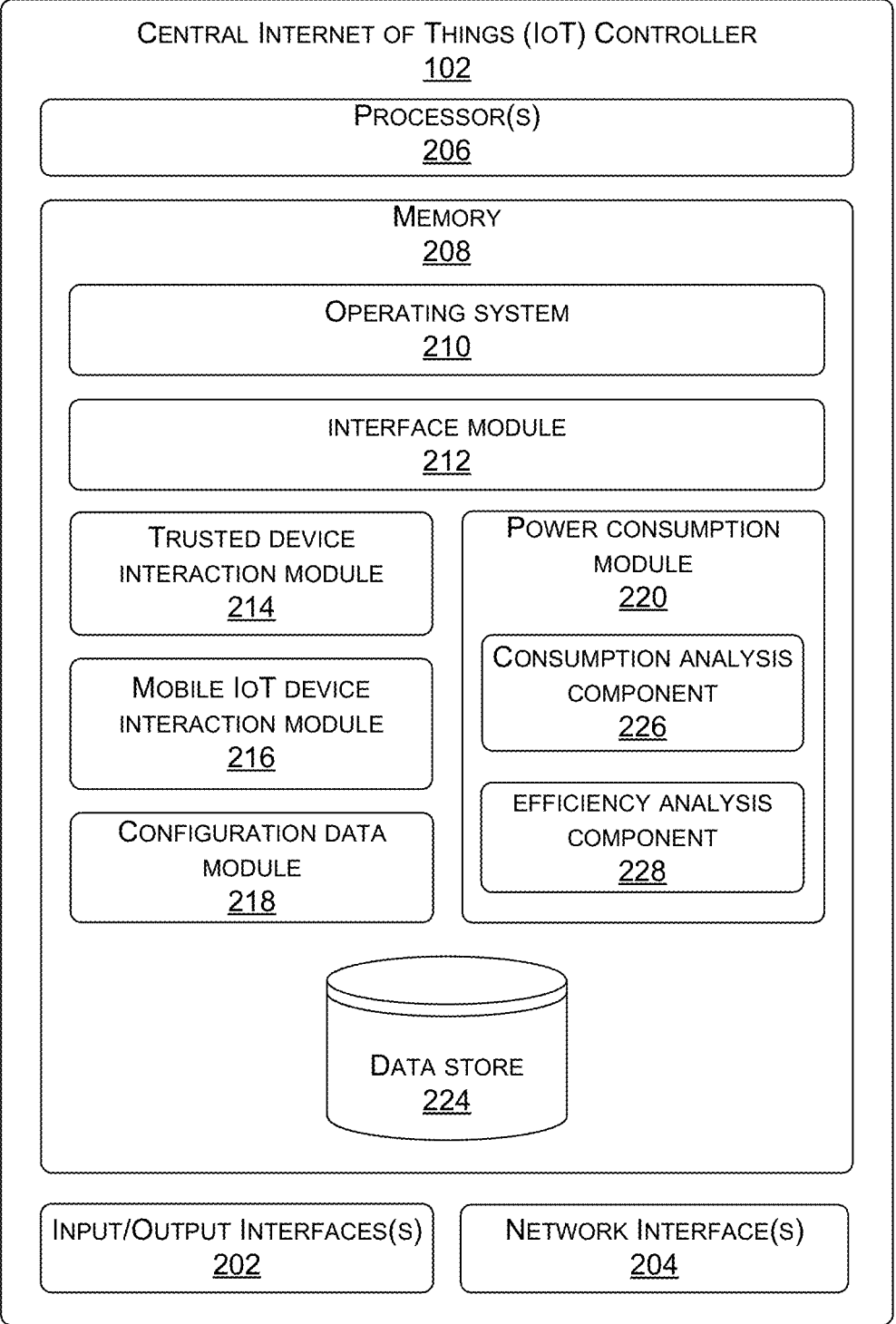
FIG. 2 illustrates a block diagram of various components of the central IoT controller.

FIG. 2 illustrates a block diagram of various components of the central IoT controller. The central IoT controller 102 may include input/output interface(s) 202. The input/output interface(s) 202 may include any type of output interface known in the art, such as a display (e.g. a liquid crystal display), speakers, a vibrating mechanism, or a tactile feedback mechanism. Input/output interface(s) 202 also include ports for one or more peripheral devices, such as headphones, peripheral speakers, or a peripheral display. Further, the input/output interface(s) 202 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the Central IoT controller 102 may include network interface(s) 204. The network interface(s) 204 may include any sort of transceiver known in the art. For example, the network interface(s) 204 may include a radio transceiver that performs the function of transmitting and receiving radio frequency communications via an antenna. In addition, the network interface(s) 204 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 204 may include wired communication components, such as an Ethernet port or a Universal Serial Bus (USB).

Further, the Central IoT controller 102 may include one or more processor(s) 206 that are operably connected to memory 208. In at least one example, the one or more processor(s) 206 may be a central processing unit(s) (CPU), graphics processing unit(s) (GPU), or both a CPU and GPU or any other sort of processing unit(s). Each of the one or more processor(s) 206 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 206 may also be responsible for executing all computer applications stored in the memory, which can be associated with common types of volatile (RAM) and/or non-volatile (ROM) memory.

In some examples, memory 208 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 208 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 208 may include an operating system 210, an interface module 212, a trusted device interaction module 214, a mobile IoT device interaction module 216, a configuration data module 218, a power consumption module 220, and a data store 222. The power consumption module 220 may further include a consumption analysis component 226 and an efficiency analysis component 228.

The operating system 312 may be any operating system capable of managing computer hardware and software resources. The operating system 210 may include an interface layer that enables applications to interface with the input/output interface(s) 202 and the network interface(s) 204.

The interface module 212 may receive and transmit data communications associated with a mobile IoT device. Data communication may include, for example, may include sensor data (i.e. power resources, geolocation, etc.), an indication of a current communication protocol being used by the mobile IoT device, an indication of communication protocols available to the mobile IoT device, and an indication of trusted devices proximate to a mobile IoT device. In some examples, the interface module 212 may be configured to monitor a mobile IoT device by pulling data communications from a mobile IoT device based at least in part on a predetermined check-in interval. Alternatively, the mobile IoT device may be configured to push the data communications to the interface module 212 based on the predetermined check-in interval.

The interface module 212 may be configured to transmit sets of configuration data to the mobile IoT device. The sets of configuration data may include computer-executable instructions that alter a configuration of a mobile IoT device. Example alterations include, but are not limited to, a change of communication protocol, an update to the predetermined check-in interval for a subset of sensors, a deactivation of a subset of sensors, an activation of a subset of sensors, or a re-routing of data communications from the mobile IoT device to the interface module 212.

The trusted device interaction module 214 may be configured to detect the presence of a trusted device within a predetermined distance of a mobile IoT device. A trusted device may be detected based on device identifiers included within data communications received from a mobile IoT device. Alternatively, the presence of a trusted device may be detected independently by interrogating the Local Access Network hosting the mobile IoT device. The designation of a trusted device may be implied based on the frequency within which the trusted device is proximate to the mobile IoT device, while the mobile IoT device is within a trusted geolocation. Alternatively, the designation may be expressed by a subscriber of the mobile IoT device. In any case, the trusted device interaction module 214 may interrogate a list of trusted devices maintained within the data store 224.

The mobile IoT device interaction module 216 may detect the presence of a second mobile IoT device that is within a predetermined distance of the first mobile IoT device. The second mobile IoT device may be detected based on device identifiers included within a data communication of a first mobile IoT device. Alternatively, the second mobile IoT device may be detected based on its own independent data communications received at the interface module 212. In another example, the mobile IoT device interaction module 216 may detect the presence of the second mobile IoT device by interrogating the Local Access Network hosting the first mobile IoT device.

The configuration data module 218 is configured to generate computer-executable instructions that update a configuration of the mobile IoT device. In non-limiting examples, the computer-executable instructions, upon receipt by the mobile IoT device, may be configured to the alter the communication protocol used by the mobile IoT device to another communication protocol available to the mobile IoT device, update the predetermined check-in interval for a subset of sensors on a mobile IoT device, activate or deactivate a subset of sensors on the mobile IoT device, or re-route data communications from a mobile IoT device to another mobile IoT device or a trusted device. In a similar vein, the configuration data module 218 may be configured to transmit computer-executable instructions to a second mobile IoT device or a trusted device that causes such devices to act as a conduit for data communications sent to and from the central IoT controller 102 and a first mobile IoT device.

The power consumption module 220 may further include a consumption analysis component 226 and an efficiency analysis component 228. The consumption analysis component 226 may be configured to analyze a current power reserve of a mobile IoT device and further infer a likely power consumption associated with a real-time operation of the mobile IoT device. In some examples, consumption analysis component 226 may retrieve, from the data store 224, historical sensor data associated with the mobile IoT device over a predetermined time interval, and further employ one or more trained machine learning algorithms to analyze the historical sensor data to infer a duration for which the mobile IoT device may operate based on its current power reserves. The consumption analysis component 226 may correlate current and historical sensor data based on a common day of the week, time of day, geolocation of the mobile IoT device, activity being performed with the mobile IoT device (i.e. running, walking, etc.), proximity to a trusted device, and/or so forth.

Further, the one or more machine learning algorithms may include but are not limited to algorithms such as supervised learning, unsupervised learning, semi-supervised learning, naive Bayes, Bayesian networks decision trees, neural networks, fuzzy logic models, multiclass decision forest, and/or probabilistic classification.

Moreover, the consumption analysis component 226 may be configured to infer/imply a trusted device status of devices that are proximate to a mobile IoT device. A trusted device status may be inferred based on the frequency with which an implied trusted device is within proximity to the mobile IoT device while the mobile IoT device is at a trusted geolocation or performing a regular activity (i.e. running, walking, etc.). A trusted device status may also be inferred based on the consistency (i.e. time of day and/or day of the week) of interactions between an implied trusted device and the mobile IoT device. For example, if the mobile IoT device interacts with a particular mobile device every Monday at 9 am, the consumption analysis component 226 may imply that the particular mobile device is an implied trusted device based on the consistency of interactions over a predetermined time interval. The predetermined time interval may be set by an operator of the central IoT controller 102 and may correspond to any time interval such as a week, a month, or any number of weeks or months.

In some examples, the consumption analysis component 226 may employ one or more machine learning algorithms to generate a data model that represents the data consumption of a mobile IoT device relative to factors such as geolocation, time of day, day of the week, activity being performed, interaction with trusted devices, and/or so forth.

The efficiency analysis component 228 may be configured to determine the means by which the power reserve of a mobile IoT device is to be conserved. The means by which the power reserve is to be conserved may be dependent on the current power reserve, the current rate of power draw, the inferred rate of continued power draw, and the inferred duration of operation until the next charge. In any case, the efficiency analysis component 228 may selectively identify a group of sensors on a mobile IoT device to deactivate to conserve power consumption. The selection of sensors may be based on one or more of non-critical sensor data, the power draw of sensors, proximity of the mobile IoT device to a trusted device, proximity of the mobile IoT device to a trusted geolocation, or proximity of the mobile IoT device to another mobile IoT device. Additionally, the efficiency analysis component 228 may identify a group of sensors that are common to both the mobile IoT device and a proximate trusted device or another proximate mobile IoT device. In doing so, the efficiency analysis component 228 may determine that the means by which the mobile IoT device is to conserve power is to activate a subset of sensors on the mobile IoT device, deactivate the remaining sensors on the mobile IoT device, and configure the proximate trusted device or other mobile IoT device to capture the sensor data associated with the remaining sensors. In a similar vein, the efficiency analysis component 228 may determine that the proximate trusted device or other proximate mobile IoT device is to act as a conduit for data communications sent to and from the central IoT controller and the mobile IoT device. The benefit of a conduit for data communications is based on the power efficiency of the mobile IoT device's communication protocols. If the communication protocol between the mobile IoT device and the proximate trusted device or other proximate mobile IoT device (i.e. Bluetooth or Wi-Fi communication protocol) is less power-hungry than the communication protocol between the mobile IoT device and then central IoT controller (i.e. RF communication protocol), the efficiency analysis component 228 may determine that rerouting data communications via the proximate trusted device or other proximate mobile IoT device, acts to conserve the power reserve of the mobile IoT device.

The data store 224 may include and maintain a list of trusted devices that are associated with individual mobile IoT devices. The data store 224 may also include historical instances of sensor data associated with mobile IoT devices that may be used to analyze current power consumption an infer a likely power draw of continued operation.

Figure 3:
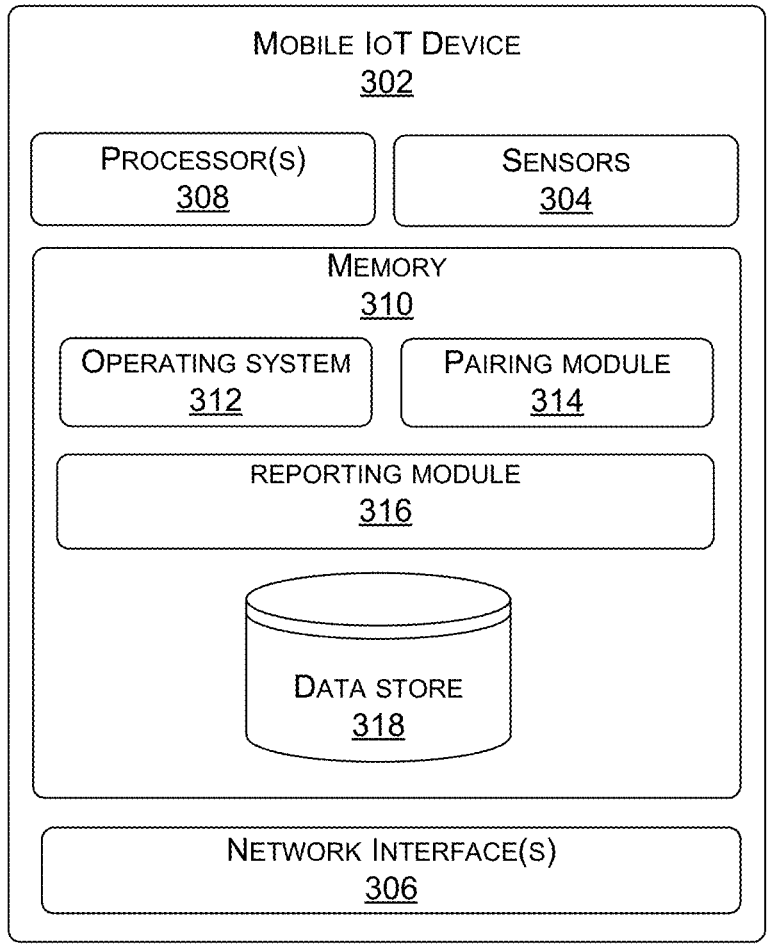
FIG. 3 illustrates a block diagram of various components of a mobile IoT device.

FIG. 3 illustrates a block diagram of various components of a mobile IoT device. In the illustrated example, the mobile IoT device 302 may include sensor(s) 304. The mobile IoT device 302 may correspond to one mobile IoT device(s) 104(1)-104(N). The sensor(s) 304 may be used to receive and/or emit a pairing signal that is part of establishing a connection with another IoT device. The sensor(s) may include an optical transducer to emit and detect a particular wavelength of light; an audio transducer to emit an audio signal of a particular frequency and to the receive the same; a heat sensor to detect a thermal profile; and one or more Radio Frequency antennae (i.e. Bluetooth, Wi-Fi, and/or so forth).

Further, the mobile IoT device 302 may include network interface(s) 306. The network interface(s) 306 may include any sort of transceiver known in the art. For example, the network interface(s) 306 may include a radio transceiver that performs the function of transmitting and receiving radio frequency communications via an antenna. In addition, the network interface(s) 306 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 306 may include wired communication components, such as an Ethernet port or a Universal Serial Bus (USB).

Further, the mobile IoT device 302 may include one or more processor(s) 308 that are operably connected to memory 310. The one or more processor(s) 308 may be similar to the one or more processor(s) 206 and the memory 310 may be similar to the memory 208. In the illustrated example, the memory 310 may include an operating system 312, a pairing module 314, a reporting module 316, and a data store 318. The operating system 312 may be similar to the operating system 210. The pairing module 314 may be configured to receive pairing data from the central IoT controller 102, and further use the pairing data to establish a connection with a counterpart mobile IoT device or a trusted device.

The reporting module 316 may be configured to send and receive data communications with the central IoT controller 102. Data communications may include device identifiers of proximate devices (i.e. trusted devices, non-trusted devices, other mobile IoT devices), sensor data, and/or so forth. The reporting module 316 may be further configured to execute computer-executable instructions (i.e. a set of configuration data) received from the central IoT controller 102. In non-limiting examples, the reporting module 316 may automate execution of a set of configuration data that alters a predetermined check-in interval for interactions between the mobile IoT device 302 and the central IoT controller 102, activates a subset of sensors on the mobile IoT device 302 while deactivating remaining sensors, or reroutes data communications via a proximate trusted device or other proximate mobile IoT device.

The data store 318 may be configured to store historical instances of electronic handshakes, corresponding responses, and data communications sent to the central IoT controller 102, other mobile IoT device(s), and trusted device(s).

FIGS. 4 through 8 present processes 400, 500, 600, 700, and 800 that relate to operations of the Central IoT controller 102. Each of the processes 400, 500, 600, 700, and 800 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, 600, 700, and 800 are described with reference to the computing environment 100 of FIG. 1.

Figure 4:
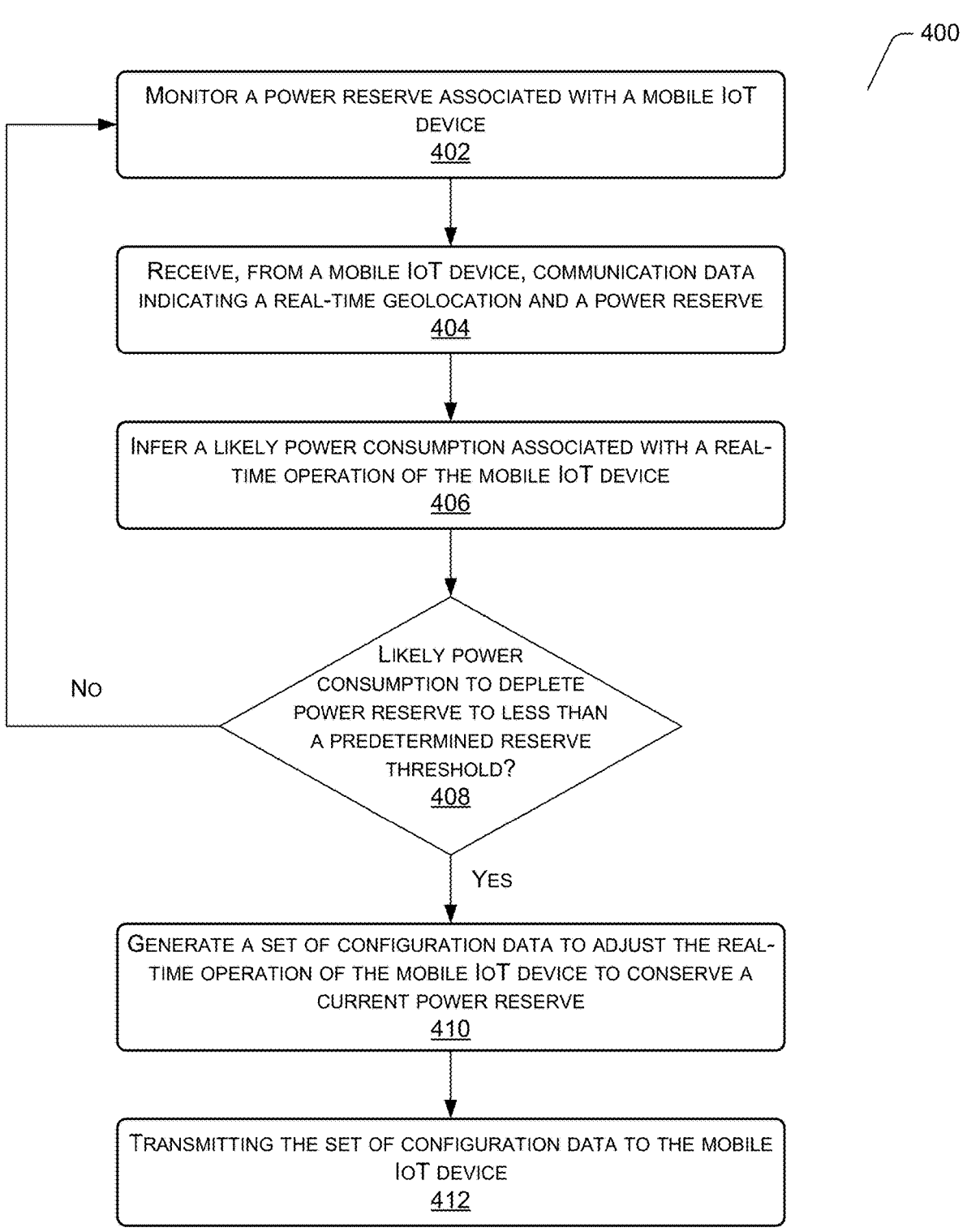
FIG. 4 illustrates a process for detecting a likely power consumption associated with a real-time operation of a mobile IoT device and generating a set of configuration data intended to conserve a current power reserve.

FIG. 4 illustrates a process for detecting a likely power consumption associated with a real-time operation of a mobile IoT device and generating a set of configuration data intended to conserve a current power reserve. In various examples, a mobile IoT device may be configured to periodically check-in with a central IoT controller 102. The periodic check-in may comprise signal data transmitted from the mobile IoT device to the central IoT controller 102 that indicates that the mobile IoT device is active. To conserve power, the mobile IoT device may transmit the signal data via an available communication protocol that draws the least power from the mobile IoT device power reserve. For example, signal data sent over a Radio Frequency (RF) communication protocol, such as Long-Term Evolution (LTE), is likely to draw more power relative to signal data transmitted over a Wi-Fi protocol or a Bluetooth protocol.

At 402, the central IoT controller may monitor a power reserve associated with a mobile IoT device. The mobile IoT device may correspond to an electronic tracking device that is configured to monitor real-time movement and environmental conditions associated with an object, individual, or an animal. By way of example, a pet tracker is one example of a mobile IoT device.

Further, the central IoT controller may monitor the central IoT controller on a continuous basis, per a predetermined schedule, or in response to a triggering event. The predetermined schedule may be a time interval that corresponds to five minutes, ten minutes, one hour, or six hours. Any time interval is possible. The triggering event may be initiated by the mobile IoT device and may correspond to a change in sensor data captured by the mobile IoT device. For example, a change in the geolocation of the mobile IoT device may be captured by the GPS sensor, which in turn, triggers the transmission of signal data to the central IoT controller.

At 404, the central IoT controller may receive data communications from a mobile IoT device in response to the monitoring event. The data communications may include an indication of the power reserve associated with the mobile IoT device and the geolocation of the mobile IoT device. In some examples, the data communications may further include device identifiers associated with other mobile IoT device(s) located within a proximate distance (i.e. distance within the range of an available communication protocol) to the mobile device. In some examples, the device identifiers may relate to trusted devices. The trusted device may correspond to a device with which the mobile IoT device has previously, and/or frequently interacted. For example, a trusted device may correspond to another mobile IoT device that is frequently within proximity to the mobile IoT device. In another example, the trusted device may correspond to an electronic device, such as a mobile phone, a computing device, a server device, or a router device that has been designated, by the central IoT controller, as a trusted device. In some examples, a trusted device status may be implied based on an association with a trusted location, such as a business or residential location. In other examples, the trusted device status may be expressed by a subscriber to the mobile IoT device, via the central IoT controller.

At 406, the central IoT controller may infer a likely power consumption associated with a real-time operation of the mobile IoT device. In some examples, the central controller may retrieve, from a data, store, historical sensor data associated with the mobile IoT device over a predetermined time interval. In doing so, the central IoT controller may employ one or more trained machine learning algorithms to analyze the historical sensor data to infer a duration associated with a real-time operation of the mobile IoT device.

For example, the mobile IoT device may transmit an indication (i.e. via data communications) that it is currently located at a recreational park, based on sensor data from a GPS sensor. The central IoT controller may analyze historical sensor data that indicates historical sensor data drawn from the mobile IoT device while the mobile IoT device is located at the recreational park. In doing so, the central IoT controller may infer a likely power consumption based on the historical sensor data.

At 408, the central IoT controller may determine whether the likely power consumption inferred by the central IoT controller is greater than a predetermined reserve threshold. In one example, the predetermined reserve threshold may correspond to the current power reserve of the mobile IoT device, as reported in process step 404, as part of the data communications.

Additionally, or alternatively, the predetermined reserve threshold may be set by an administrator of the central IoT controller, so as to factor power reserve depletion due to the age of the mobile IoT device power supply. Further, the predetermined reserve threshold may also factor an inference of a next likely power charge of the mobile IoT device, as evidenced within the historical sensor data.

At 410, the central IoT controller may determine that the likely power consumption inferred by the central IoT controller is likely to deplete the power reserve to less than the predetermined reserve threshold. In this instance, the central IoT controller may generate a set of configuration data to adjust the real-time operation of the mobile IoT device to conserve the current power reserve, as reported in process step 404, as part of the data communications.

In one example, the set of configuration data may generate an updated check-in interval for at least one sensor associated with the mobile IoT device. The updated check-in interval may be longer than the current check-in interval and accordingly, converse a portion of the power reserve associated with the mobile IoT device. In some examples, the updated check-in interval may differ between sensors of the mobile IoT device and may be further based on historical sensor data gleaned from the mobile IoT device by the central IoT controller. For example, the check-in interval for a temperature sensor may be longer than the check-in interval for an accelerometer, proximity sensor, or GPS sensor. In addition, if the central IoT controller determines that the mobile IoT device has arrived at a frequently visited geolocation, the central IoT controller may infer a regular duration that the mobile IoT device remains at the subject geolocation, based on historical sensor data, and in doing so, generate an updated check-in interval for the GPS sensor based on the inferred duration.

In a second example, the central IoT controller may determine that the mobile IoT device is within a predetermined distance of a trusted device. In doing so, the central IoT controller may infer that the mobile IoT device is at a trusted location, and further update the check-in interval for sensors of the mobile IoT device, accordingly. Similar to the example of the frequently visited geolocation, the central IoT controller may infer a likely duration that the mobile IoT device is to remain within proximity to the trusted device, and in doing so, generate an updated check-in interval for sensors of the mobile IoT device based on the inferred duration.

In a third example, the central IoT controller may prioritize the transmission of sensor data associated with a first subset of sensors of the mobile IoT device relative to a second subset of sensors. The prioritization of sensor data may be based on the geolocation of the mobile IoT device and an inferred likely power consumption. For example, the central IoT controller may determine that the mobile IoT device is located within an unfamiliar geolocation, and therefore may prioritize the transmission of GPS sensor data at nominal check-in intervals over temperature sensor data. In another example, the central IoT controller may determine that the mobile IoT device is located within a familiar geolocation, such as a residential home, and therefore may prioritize temperature sensor data at nominal check-in intervals over GPS sensor data.

Moreover, the set of configuration data may include computer-executable instructions that adjust the real-time operation of the mobile IoT device.

At 412, the central IoT controller may transmit the set of configuration data to the mobile IoT device. In some examples, the central IoT controller may determine that the mobile IoT device is proximate to a trusted device. In doing so, the central IoT controller may interact with the trusted device to determine a first power consumption of the mobile IoT device that is associated with the mobile IoT device receiving the set of configuration data from the trusted device via a least power-hungry communication protocol available to both the trusted device and the mobile IoT device. Available communication protocols may include a Radio Frequency (RF) communication protocol, such as Long-Term Evolution (LTE), a Wi-Fi communication protocol, or a Bluetooth communication protocol.

Next, the central IoT controller may determine a power consumption associated with the mobile IoT device that is associated with the mobile IoT device receiving the set of configuration data directly from the central IoT controller. In this instance, the communication protocol for delivery of the set of configuration data to the mobile IoT device is likely to be an RF communication protocol, which is the most power-exhausting communication protocol.

In the event that the central IoT controller determines that less power-hungry communication protocol (i.e. a Bluetooth communication protocol or a Wi-Fi communication protocol relative to an RF communication protocol) is available to the trusted device to deliver the set of configuration data to the mobile IoT device, the central IoT controller may transmit the set of configuration data to the trusted device.

In doing so, the set of configuration data may further include computer-executable instructions that cause the trusted device to transmit the set of configuration data to the mobile IoT device via the less power-hungry communication protocol that was identified as being available to the trusted device and the mobile IoT device.

FIG. 5 illustrates a process for deactivating a subset of sensors associated with mobile IoT device while the mobile IoT device is proximate to a trusted device. In this example, the central IoT controller may detect and monitor an interaction between the mobile IoT device and the trusted device. While the mobile IoT device is proximate to the trusted device, the central IoT controller may identify a subset of sensors on the mobile IoT device that also reside on the trusted device. In doing so, the central IoT controller may act to deactivate the subset of sensors on the mobile IoT device and instead capture the same sensor data from the corresponding subset of sensors on the trusted device. In this way, the central IoT controller may reduce the power consumption of the mobile IoT device, while capturing the sensor data from the trusted device proximate to the mobile IoT device.

Further, upon receipt of sensor data from a mobile IoT device and a trusted device, the central IoT controller may be configured to aggregate the sensor data from each device based on proximate time and geolocation stamps.

At 502, the central IoT controller may receive data communications a mobile IoT device that indicates a current power reserve. The central IoT controller may determine that the power reserve is less than a predetermined reserve threshold. The predetermined reserve threshold may correspond to a minimum power reserve that is required to maintain an operation of the mobile IoT device until a next likely power charge. Thus, the predetermined reserve threshold may vary based on an inferred time interval until the next likely power charge. In one example, the central IoT controller may employ one or more machine-learning algorithms to analyze historical sensor data associated with the mobile IoT device, and in doing so, infer a time interval until the next likely power charge and the power consumption that is likely to occur during that time interval.

At 504, the central IoT controller may detect a trusted device within a predetermined distance of the mobile IoT device. The central IoT controller may detect the presence of the trusted device based on device identifiers included within data communications received from the mobile IoT device. Alternatively, or additionally, the central IoT controller may detect the trusted device independently, based on the proximity of the trusted device to the geolocation of the mobile IoT device.

At 506, the central IoT controller may identify a group of sensors that are common to both the trusted device and mobile IoT device. A group of common sensors may include but is not limited to, a GPS sensor, a temperature sensor, a microphone, or an accelerometer.

At 508, the central IoT controller may generate the first set of configuration data for the mobile IoT device to deactivate the group of common sensors on the mobile IoT device and the second set of configuration data for the trusted device to capture sensor data from the group of common sensors on the trusted device.

At 510, the central IoT controller may transmit the first set of configuration data to the mobile IoT device and the second set of configuration data to the trusted device. In an alternative embodiment, the central IoT controller may also transmit the first set of configuration data to the trusted device. In doing so, the first set of configuration data may further include computer-executable instructions that cause the trusted device to transmit the first set of configuration data to the mobile IoT device. This alternative embodiment may conserve the power reserve of the mobile IoT device if the communication protocol (i.e. Wi-Fi or Bluetooth communication protocol) between the trusted device and the mobile IoT device draws less power than the communication protocol (i.e. RF communication protocol) between the central IoT controller and the mobile IoT device.

Figure 6:
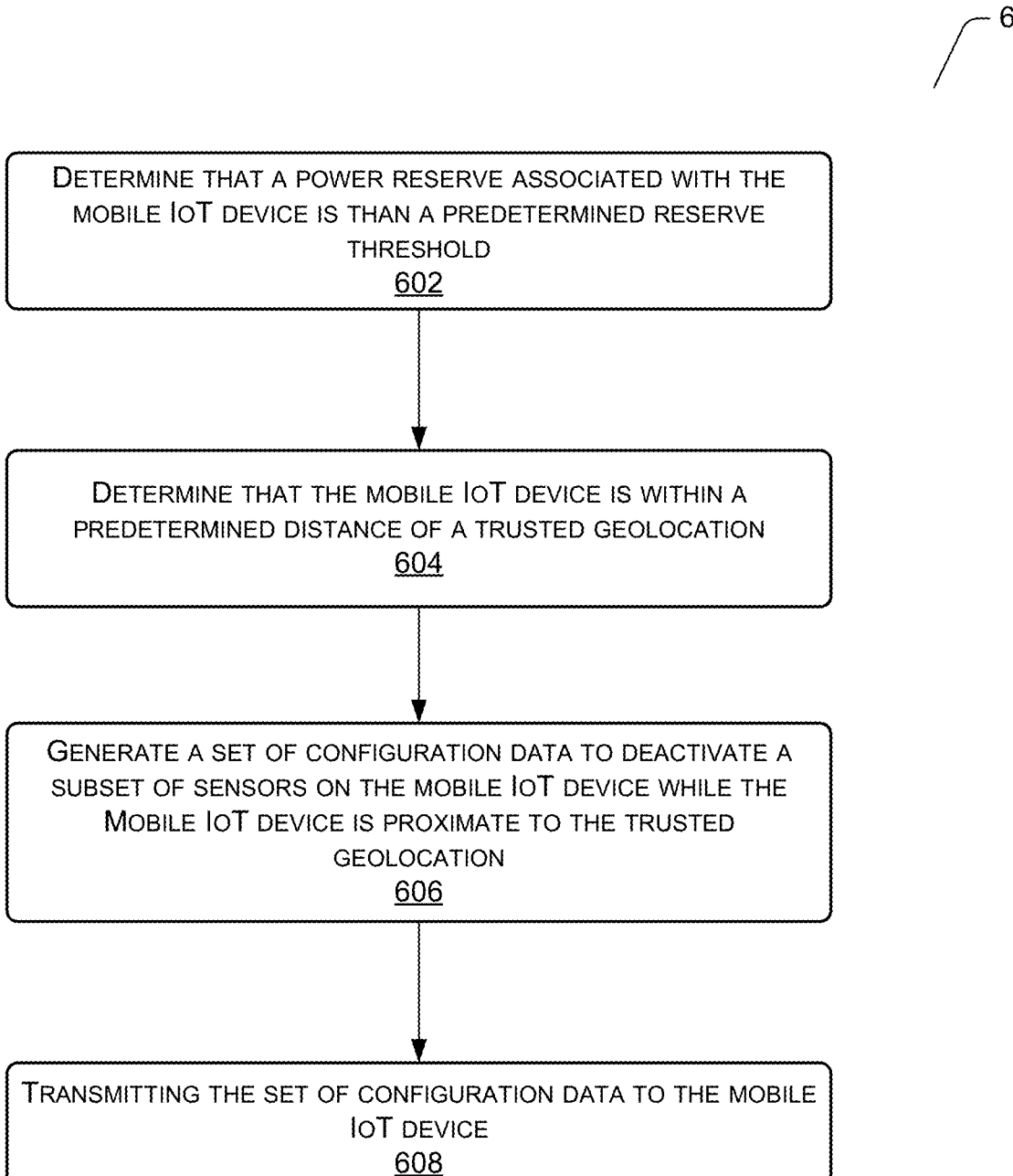
FIG. 6 illustrates a process for deactivating a subset of sensors associated with mobile IoT device while the mobile IoT device is proximate to a trusted location.

FIG. 6 illustrates a process for deactivating a subset of sensors associated with mobile IoT device while the mobile IoT device is proximate to a trusted location. In this example, the central IoT controller may detect and monitor the geolocation of the mobile IoT device via data communications received at predetermined check-in intervals. In doing so, the central IoT controller may employ one or more machine-learning algorithms to correlate a current geolocation of the mobile IoT device with historical sensor data to infer whether the current geolocation is a trusted geolocation. In response to determining that the current geolocation of the mobile IoT device is a trusted geolocation, the central IoT controller may act to deactivate a subset of sensors on the mobile IoT device to reduce power consumption.

In an alternative embodiment, rather than deactivating the subset of sensors on the mobile IoT device, the central IoT controller may act to update the check-in interval for the subset of sensors to be greater than the original check-in interval, so as to conserve a portion of the current power reserve of the mobile IoT device.

At 602, the central IoT controller may determine that a power reserve associated with the mobile IoT device is less than a predetermined reserve threshold. In doing so, the central IoT controller may analyze the geolocation of the mobile IoT device to identify power conservation options.

At 604, the central IoT controller may determine that the mobile IoT device is within a predetermined distance of a trusted geolocation. The central IoT controller may infer that a geolocation is a trusted geolocation based on historical sensor data associated with the mobile IoT device that indicates that the current geolocation is frequently visited by the mobile IoT device. Alternatively, or additionally, the current geolocation may have been designated as a trusted location by a user of the mobile IoT device or an administrator of the central IoT controller.

At 606, the central IoT controller may generate a set of configuration data to deactivate a subset of sensors on the mobile IoT device while the mobile IoT device is proximate to the trusted geolocation. Alternatively, or additionally, the central IoT controller may update the check-in interval for some sensors, such as the GPS sensor to be greater than the original check-in interval, so as to conserve a portion of the current power reserve on the mobile IoT device. In this way, the updated check-in interval associated with the GPS sensor can provide the central IoT controller with an indication, albeit at a later point in time, relating to when the mobile IoT device has left the trusted geolocation.

At 608, the central IoT controller may transmit the set of configuration data to the mobile IoT device. The set of configuration data may include computer-executable instructions that dynamically deactivate the subset of sensors and, in some cases, update the check-in interval of other sensors, such as a GPS sensor.

FIG. 7 illustrates a process for apportioning the capture of sensor data to mobile IoT devices that are within a predetermined distance to one another. In the illustrated examples, sensor data associated with a common group of sensors is divided between a first mobile IoT device and a second mobile IoT device. However, in alternative embodiments, the capture of sensor data associated with a common group of sensors may be divided among any number of mobile IoT devices that are within a predetermined distance of one another.

Further, upon receipt of sensor data from a plurality of mobile IoT devices, the central IoT controller may be configured to aggregate the sensor data based on proximate time and geolocation stamps.

At 702, the central IoT controller may determine that a power reserve associated with a first mobile IoT device is less than a predetermined reserve threshold. In various examples, the central IoT controller may factor the age of the mobile IoT device power supply when determining that the power reserve is less than the predetermined reserve threshold.

At 704, the central IoT controller may detect a second mobile IoT device that is within a predetermined distance of the first mobile IoT device. In one example, the central IoT controller may detect the presence of the second mobile IoT device based on device identifiers included within data communications received from the first mobile IoT device. Alternatively, or additionally, the central IoT controller may detect the second mobile IoT device independently, via data communications received from the second mobile IoT device.

At 706, the central IoT controller may identify a group of sensors that are common to both the first mobile IoT device and the second mobile IoT device. A group of common sensors may include but is not limited to, a GPS sensor, a temperature sensor, a microphone, or an accelerometer.

At 708, the central IoT controller may divide the group of common sensors into a first and second subset of common sensors, whereby each subset of common sensors is to be activated on one of the first mobile IoT device or the second mobile IoT device. As part of dividing the group of common sensors into the first and second subsets, the central IoT controller may analyze the power draw of individual common sensors within the group of common sensors and divide the group of common sensors based at least in part on the individual power draws. Additionally, the central IoT controller may also factor the power reserve of the first mobile IoT device and the second mobile IoT device when generating the first and second subsets of common sensors.

At 710, the central IoT controller may generate a first set of configuration data that is intended for the first mobile IoT device. The first set of configuration data may activate the first subset of common sensors and deactivate the second subset of common sensors on the first mobile IoT device.

Similarly, the central IoT controller may generate a second set of configuration data that is intended for the second mobile IoT device. The second set of configuration data may activate the second subset of common sensors and deactivate the first subset of common sensors on the second mobile IoT device.

At 712, the central IoT controller may transmit the first set of configuration data to the first mobile IoT device and the second set of configuration data to the second mobile IoT device. In an alternative embodiment, the central IoT controller may transmit the first and second sets of configuration data to the first or second mobile IoT devices. By way of example, the central IoT controller may transmit the first and second sets of configuration data to the first mobile IoT device, and further include additional computer-executable instructions with the second set of configuration data that causes the first mobile IoT device to transmit the second set of configuration data to the second mobile IoT device. This alternative embodiment may conserve the power reserve of the second mobile IoT device if the communication protocol (i.e. Wi-Fi or Bluetooth communication protocol) between the first mobile IoT device and the second mobile IoT device draws less power than the communication protocol (i.e. RF communication protocol) between the central IoT controller and the second mobile IoT device.

FIG. 8 illustrates a process for facilitating the transmission and receipt of data communications between the central IoT controller and a first mobile IoT device to occur via a second mobile IoT device or a trusted device. In the illustrated example, the central IoT controller may selectively route data communications via alternate devices, such as a second mobile IoT device or a trusted device, in order to reduce the power consumption associated with the first mobile IoT device receiving and/or transmitting data communications via a communication protocol associated with the central IoT controller.

For example, the central IoT controller may typically interact with the first mobile IoT device via an RF communication protocol. In other words, the first mobile IoT device may receive sets of configuration data from the central IoT controller via the RF communications protocol and transmit communications data to the central IoT controller via the RF communications protocol. However, in the event that a second mobile IoT device (with sufficient power reserve) or a trusted device is located within a predetermined distance of the first mobile IoT device, the central IoT controller may configure the second mobile IoT device or the trusted device to act as an intermediary, such that data communications may be sent to and/or received from the first mobile device via the second mobile IoT device or the trusted device. The second mobile IoT device or the trusted device would subsequently use a communication protocol that draws less power than an RF communication protocol to send and/or receive data communications from the first mobile IoT device.

At 802, the central IoT controller may determine that a power reserve of a first mobile IoT device is less than a predetermined reserve threshold.

At 804, the central IoT controller may detect the presence of one of a second mobile IoT device or trusted device within a predetermined distance of the first mobile IoT device. The central IoT controller may detect the presence of the second mobile IoT device or the trusted device based on device identifiers included within data communications received from the first mobile IoT device.

At 806, the central IoT controller may generate a set of configuration data that facilitates the transmission and receipt of data communications between the central IoT controller and the first mobile IoT device to occur via the second mobile IoT device or the trusted device. The set of configuration data may further identify a common communication protocol (i.e. a Wi-Fi communication protocol or a Bluetooth communication protocol) that is to be used by the second mobile IoT device or the trusted device for transmitting and/or receiving data communications from the first mobile device.

At 808, the central IoT controller may transmit the set of configuration data to at least the second mobile IoT device or the trusted device. The set of configuration data may be sent to the first mobile IoT device via the central IoT controller, or the second mobile IoT device or the trusted device.

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. One or more non-transitory computer-readable media storing computer-executable instructions that, when executed on one or more processors, cause the one or more processors to perform acts comprising:

receiving, from a mobile IoT device, data communications indicating a real-time geolocation of the mobile IoT device, one or more device identifiers, and a power reserve associated with the mobile IoT device;

determining that the power reserve is less than a predetermined reserve threshold;

detecting a second device, associated with a second device identifier, that is located within a predetermined distance of the mobile IoT device;

interrogating a list of trusted devices for the one or more device identifiers received from the mobile IoT device;

finding the second device identifier in the interrogated list of trusted devices;

determining, in response to finding the second device identifier in the interrogated list of identifiers, that the second device is a trusted device;

generating a set of configuration data for delivery to the mobile IoT device, based at least in part on the power reserve and the geolocation, the set of configuration data configured to deactivate a capture of sensor data from a subset of sensors of the mobile IoT device in response to detecting that the trusted device is within the predetermined distance to the mobile IoT device;

determining a first power efficiency associated with the mobile IoT device receiving the set of configuration data from a Central IoT controller via a first communication protocol relative to a second power efficiency associated with the mobile IoT device receiving the set of configuration data from the trusted device via a second communication protocol that consumes less power than the first communication protocol;

determining that the second power efficiency is greater than the first power efficiency; and in response to determining that the second power efficiency is greater than the first power efficiency, transmitting, via the first communication protocol, the set of configuration data to the trusted device, wherein the set of configuration data further includes computer-executable instructions that cause the trusted device to transmit the set of configuration data to the mobile IoT device via the second communication protocol.

2. The one or more non-transitory computer-readable media of claim 1, further storing instructions that, when executed cause the one or more processors to perform acts comprising:

generating an updated check-in interval for a Global Positioning Sensor (GPS) sensor of the mobile IoT device, the updated check-in interval being greater than an original check-in interval to conserve a portion of power reserve associated with the mobile IoT device, and wherein the set of configuration data further includes the updated check-in interval.

3. The one or more non-transitory computer-readable media of claim 2, wherein the acts further comprise:

determining that the location of the second device is a trusted geolocation; and determining that the mobile IoT device is within a predetermined distance of a trusted geolocation, wherein the location of the second device is determined to be a trusted geolocation based on historical sensor data associated with the mobile IoT device that indicates that the current geolocation is frequently visited by the mobile IoT device; and wherein generating the updated check-in interval is based at least in part on the mobile IoT device being within the predetermined distance of the trusted geolocation.

4. The one or more non-transitory computer-readable media of claim 1, wherein the first communication protocol corresponds to a Radio Frequency (RF) communication protocol, and the second communication protocol corresponds to one of a Wi-Fi communication protocol or a Bluetooth communication protocol.

5. The one or more non-transitory computer-readable media of claim 1, wherein the acts further comprise:

activating a second subset of the sensors on the trusted device; and transmitting configuration data to the trusted device to configure the trusted device to capture sensor data with the second subset of sensors in place of the deactivated first subset of sensors on the mobile IoT device.

6. The one or more non-transitory computer-readable media of claim 1, wherein the acts further comprise:

employing machine learning to correlate the geolocation of the mobile IoT device with historical sensor data to determine that the current geolocation is a trusted geolocation based on the historical sensor data as input data that indicates a frequency of visits by the mobile IoT device to the geolocation, wherein the deactivating of the capture of sensor data is based on proximity of the mobile IoT device to the trusted geolocation.

7. The one or more non-transitory computer-readable media of claim 1, further storing instructions that, when executed, cause the one or more processors to perform acts comprising:

generating an additional set of configuration data that includes computer-executable instructions that cause the mobile IoT device to transmit sensor data to the trusted device, and that further cause the trusted device to transmit the sensor data to a Central IoT controller; and transmitting the additional set of configuration data to at least the trusted device.

8. A method of reducing power consumption, comprising:

receiving, from a mobile IoT device, data communications indicating a real-time current geolocation of the mobile IoT device and a power reserve associated with the mobile IoT device;

correlating the current geolocation of the mobile IoT device with historical sensor data;

determining that the current geolocation is a trusted geolocation based on the historical sensor data; and in response to determining that the current geolocation of the mobile IoT device is a trusted geolocation:

generating configuration data configured to deactivate a first subset of sensors on the mobile IoT device; and transmitting the configuration data to the mobile IoT device, wherein the sensors include sensors common to the mobile IoT device and to a trusted device, and the method further comprises:

activating a second subset of the sensors on the trusted device;

transmitting configuration data to the trusted device to configure the trusted device to capture sensor data with the second subset of sensors in place of the deactivated first subset of sensors on the mobile IoT device;

determining a first power efficiency associated with the mobile IoT device receiving the set of configuration data from a Central IoT controller via a first communication protocol relative to a second power efficiency associated with the mobile IoT device receiving the set of configuration data from the trusted device via a second communication protocol that consumes less power than the first communication protocol;

determining that the second power efficiency is greater than the first power efficiency; and in response to determining that the second power efficiency is greater than the first power efficiency, transmitting, via the first communication protocol, the set of configuration data to the trusted device, wherein the set of configuration data further includes computer-executable instructions that cause the trusted device to transmit the set of configuration data to the mobile IoT device via the second communication protocol.

9. The method of claim 8, wherein the correlating of the current geolocation of the mobile IoT device with historical sensor data employs machine learning based on the historical sensor data as input data that indicates a frequency of visits by the mobile IoT device to the current geolocation, and the method further comprises:

monitoring the geolocation of the mobile IoT device via data communications received from the mobile IoT device; and deactivating the subset of sensors on the mobile IoT device based on proximity of the mobile IoT device to the trusted geolocation.

10. The method of claim 9, wherein:

the monitoring includes receiving check-in signals from the mobile IoT device at a check-in interval; and the configuration data includes computer-executable instructions for the mobile IoT device to deactivate the subset of sensors and update the check-in interval of the sensors other than those deactivated.

11. The method of claim 8, wherein the trusted device is another mobile IoT device.

12. The method of claim 8, further comprising:

generating an additional set of configuration data that includes computer-executable instructions that cause the mobile IoT device to transmit sensor data to the trusted device, and that further cause the trusted device to transmit the sensor data to a Central IoT controller; and transmitting the additional set of configuration data to at least the trusted device.

* * * * *